May 27, 1952            J. C. HARVEY            2,598,165
UNIVERSAL CHUCK
Filed Aug. 4, 1948                                                      2 SHEETS—SHEET 1
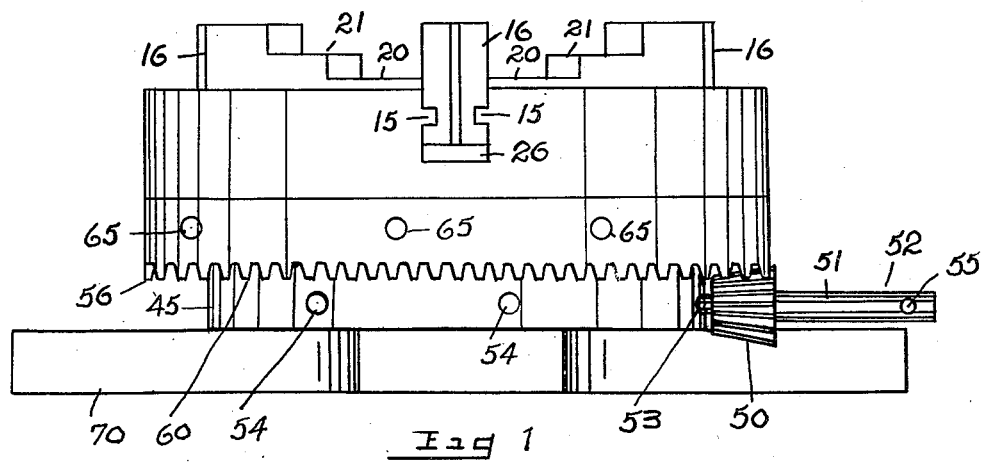
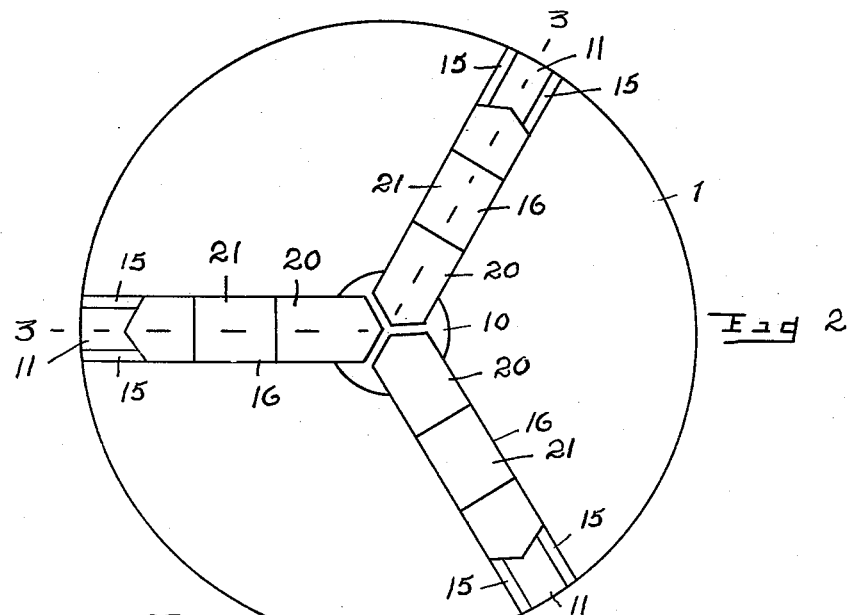
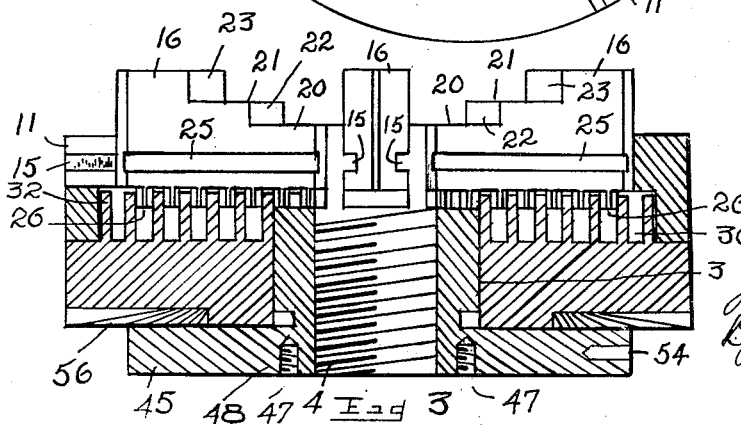
Inventor
J. Carlton Harvey
By Thomas L. Wilder
Attorney May 27, 1952     J. C. HARVEY     2,598,165
UNIVERSAL CHUCK Filed Aug. 4, 1949     2 SHEETS—SHEET 2

Inventor
J. Carlton Harvey
Thomas L. Wilder
Attorney

Patented May 27, 1952

2,598,165

UNITED STATES PATENT OFFICE 2,598,165

UNIVERSAL CHUCK

Jesse Carlton Harvey, Oneida, N. Y., assignor to Westcott Chuck Company, Oneida, N. Y., a corporation of New York Application August 4, 1948, Serial No. 42,461

1 Claim. (Cl. 279—114)

My invention relates to a universal chuck and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide a chuck more particularly for use in small shops and in home work shops. The chuck is provided with means of rotating the scroll which operates the jaws by the insertion of the end of a key wrench into holes in the periphery of the scroll, whereby it can be operated over the maximum range very rapidly.

There is also means for rotating the scroll, whereby to provide sufficient grip for turning cuts in the lathe consisting of a bevel gear pinion formed integral with the key wrench which meshes with gear teeth on the underside of the scroll. This latter method provides an 8 to 1 ratio to enable the operator to grip and securely hold anything within the range of the chuck.

The back ring below the scroll gear is provided with holes spaced 60° apart to receive the key wrench thus creating the effect of a six pinion chuck so that no matter where the chuck stops it will be possible to insert a wrench without revolving the chuck to find the pinion.

Furthermore, it is provided with a utility adapter flat plate mounting a stud threaded 1½-8 on which the chuck is threaded. The plate may then be bolted to an angle plate, a drill press table, milling machine table or like device by use of bolts.

The object will be understood by referring to the drawings in which

Fig. 1 is a side elevation of the chuck.

Fig. 2 is a plan view looking down from above.

Fig. 3 is a section taken on the line 3—3 of Fig. 2.

Figure 4:
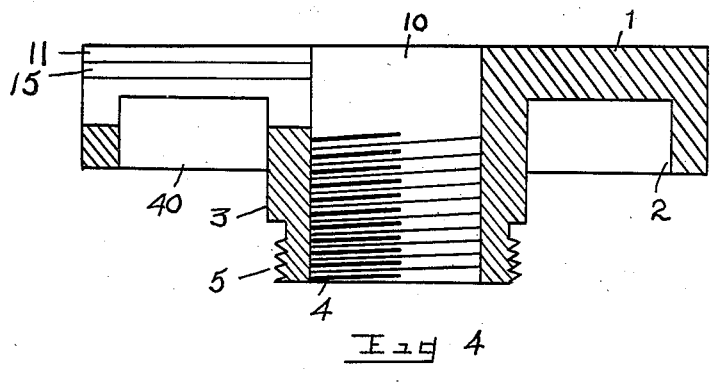
Fig. 4 is a detail view showing a central vertical section of an inverted cup shaped member used.
Figures 5, 6, 7:
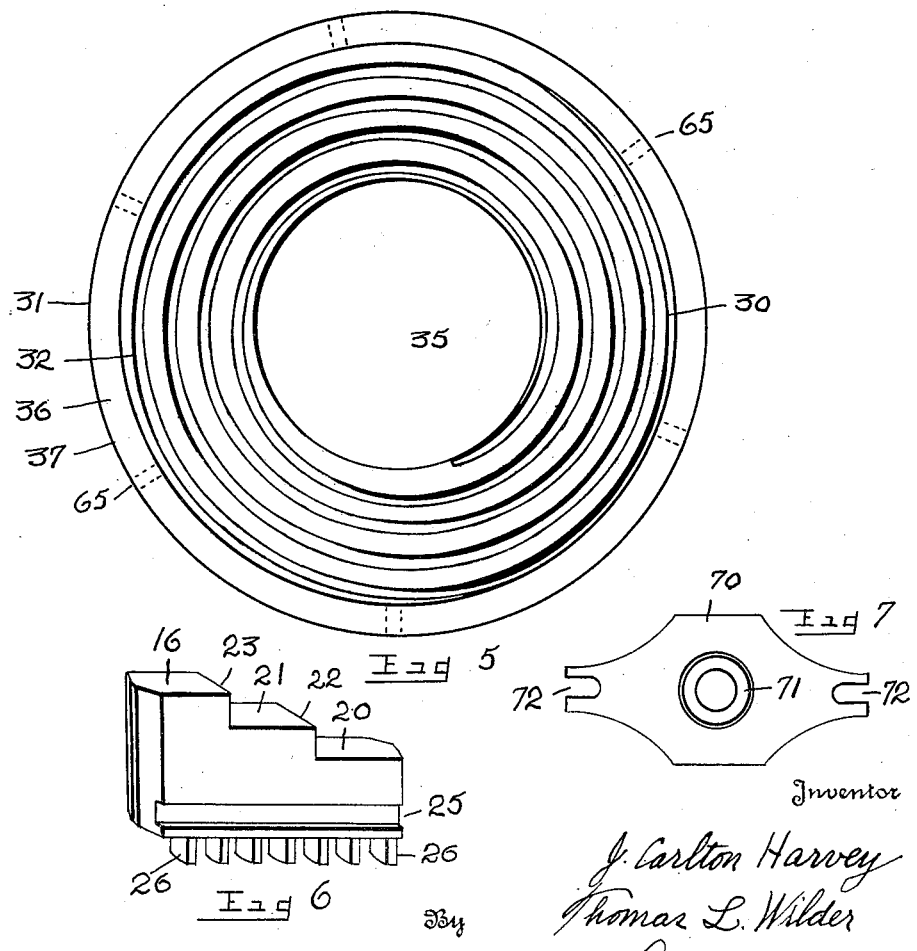
Fig. 5 is a plan view of a scroll used.
Fig. 6 is a detail view showing a perspective of one of the jaws used.
Fig. 7 is a plan view on reduced scale of a utility adapter plate used to support the chuck.

Referring more particularly to the drawings, the chuck embodies a circular inverted cup shaped member 1 having a depending peripheral flange 2 and a central depending sleeve 3 which has interior threads 4 and exterior threads 5 for a purpose hereinafter mentioned.

Member 1 has a central opening 10. Three radially disposed open recesses 11, 11, 11 are formed in the upper surface of member 1. They are disposed at about an angle of 120 degrees to each other and communicate with central opening 10. Projecting into each of said recesses from opposite sides thereof are ridges 15, 15 formed integral with member 1. Said ridges 15, 15 are disposed about midway between the upper and lower surfaces of member 1. They extend longitudinally to said recesses 11 and form runners on which jaws 16, 16 hereinbelow mentioned slide and are held from vertical displacement.

Each of the jaws 16 has two upper surfaces at 20 and 21 arranged on different planes, whereby shoulders are formed at 22 and 23.

Said planes 20, 21 and shoulders 22 and 23 will support and hold objects of different diameters. The opposite lateral sides of jaws 16 are grooved at 25, 25 to fit ridges 15, 15 on which said jaws 16 slide as above mentioned. The opposite ends of each of said jaws 16 are V-shaped, whereby to allow said jaws 16 to approach each other with their contiguous faces making contact.

Transversely disposed depending oval shaped teeth 26 extend across the lower surface of each of said jaws 16. Said teeth 26 engage a spiral groove 30 formed in the upper surface of scroll 31 by a spiral member or ridge 32, whereby the turning of said scroll 31 relative to member 1 will force jaws 16 towards or away from each other in accordance with the direction of turning of said scroll 31.

Scroll 31 has formed on its upper surface upstanding spiral member 32 that starts near the periphery thereof and ends near the central opening 35. A narrow marginal space 36 between the surface of spiral member 32 and the outer peripheral surface 37 of scroll 31 will allow for fitting said spiral member 32 up into the chamber 40 formed in member 1 and to turn therein for moving jaws 16 inward towards each other or outward away from each other.

The central opening 35 made in scroll 31 will allow said scroll 31 to be fitted to sleeve 3 and turn thereon. It will be held in place by a back ring 45 screw mounted to the external threads 5 formed on the lower end of sleeve 3. It is held from turning relative to member 1 and sleeve 3 by screws 47, 47 engaging diametrically disposed threaded apertures 48, 48 made partially in sleeve 3 and partially in ring 45.

The means for turning scroll 31 contemplates a beveled gear pinion 50 formed integral with the shaft 51 of a key wrench 52 that has a reduced extension 53 at one end adapted to be removably projected into any one of the six recesses 54 spaced about sixty degrees apart made in the lateral surface of back ring 45. Said recesses 54 are disposed radially and at approximately equal intervals apart.

The outer end of shaft 51 is provided with a cross aperture for the sliding fit of a rod 55 disposed at right angles to shaft 51. The ends of rod 55 are enlarged slightly after it is assembled to prevent said rod from slipping out of its bearing in shaft 51.

The beveled teeth of pinion 50 will mesh with the teeth 56 of gear 60 formed on the lower surface about the periphery of beveled scroll 31 when the extended part 53 of shaft 51 is inserted into any one of the recesses 54 in back ring 45. The turning of beveled pinion 50 by means of key wrench 52 with its cross rod 55 serving as a handle will cause the turning of scroll 31 and the corresponding movement of jaws 16.

Recesses 65 are made also in the lateral surface of scroll 31 at suitable intervals for the insertion of the extended end 53 of shaft 51 for turning scroll 31 over the maximum range very rapidly.

The chuck can be mounted on a flat utility adapter plate 70 having a threaded upstanding stud 71 for engaging the internal threads 4 of sleeve 3 on member 1.

Open recesses 72, 72 are made in the opposite reduced ends of plate 70, whereby to bolt said plate 70 to a drill press table or the like.

Operation

In operation the user will bolt the adapter plate 70 to a drill press or other suitable fixture and then mount the chuck thereon by engaging the internal threads 4 of sleeve 3 with stud 71 of the plate 70.

For use on the lathe, not shown, the chuck is threaded on to the lathe spindle by means of the interior threads 4 in central depending sleeve 3.

The jaws 16 are operated in a rapid manner over the extreme range of the chuck by inserting the key wrench extension 53 into a convenient recess 65 in the scroll 31 and rotating by the aid thereof.

To obtain maximum gripping force the key wrench extension 53 is inserted into one of the six convenient recesses 54 in back ring 45 and engaging beveled gear pinion 50 with teeth 56 of gear 60 and then rotating said pinion 50 by means of said key wrench 52.

Furthermore, the six spaced recesses 54 in the back ring 45 will create the effect of a six pinion chuck, whereby no matter where the scroll 31 stops it will be possible to insert extended end 53 of the key wrench 52 into one of said recesses 54 without revolving the chuck to find the pinion.

What I claim is:

In a universal chuck, a member having radial recesses, ridges formed in said member, jaws having V-shaped ends, whereby to allow their contiguous ends to meet in a common center, recesses formed in said jaws, whereby to slidingly mount said jaws on said ridges, depending oval shaped teeth formed in said jaws, a depending sleeve formed in said first named member, a scroll mounted to turn on said depending sleeve, a spiral recess formed in said scroll for the reception of said oval shaped teeth, a ring screw mounted to said depending sleeve, bolts engaging said ring and sleeve, whereby to hold said ring in assembled position on said sleeve, a gear rack formed on said scroll, a beveled pinion adapted to engage said gear rack, a shaft carrying said pinion, and peripheral recesses formed in said ring for the reception of said shaft.

J. CARLTON HARVEY.

REFERENCES CITED

The following references are of record in the file of this patent:

UNITED STATES PATENTS

| Number | Name | Date |
|--------|------|------|
| 1,692 | Fairman | July 18, 1840 |
| 83,349 | Whiton | Oct. 20, 1868 |
| 224,119 | Whiton | Feb. 3, 1880 |
| 1,831,225 | Bogart | Nov. 10, 1931 |